(12) United States Patent
Harper

(10) Patent No.: US 9,537,528 B1
(45) Date of Patent: Jan. 3, 2017

(54) METHOD AND SYSTEM FOR SECURING A MOBILE ELECTRONIC DEVICE

(71) Applicant: Richard Harper, Eagle, ID (US)

(72) Inventor: Richard Harper, Eagle, ID (US)

(73) Assignee: Harper Aviation, Inc., Eagle, ID (US)

( * ) Notice: Subject to any disclaimer, the term of this patent is extended or adjusted under 35 U.S.C. 154(b) by 0 days.

(21) Appl. No.: 14/885,093

(22) Filed: Oct. 16, 2015

Related U.S. Application Data

(60) Provisional application No. 62/064,706, filed on Oct. 16, 2014.

(51) Int. Cl.
*H04M 1/00* (2006.01)
*H04B 1/3888* (2015.01)

(52) U.S. Cl.
CPC .................. *H04B 1/3888* (2013.01)

(58) Field of Classification Search
CPC ....... B42F 13/26; B42F 13/22; B42F 13/0006; B42F 13/002; B42F 13/38; B42F 13/00; B42F 13/0066; H04M 1/0283; H04M 1/18; H04M 1/185
See application file for complete search history.

(56) References Cited

U.S. PATENT DOCUMENTS

2012/0148334 A1* 6/2012 Merzon .................. B42F 13/00
402/4

* cited by examiner

*Primary Examiner* — Ronald Eisner
(74) *Attorney, Agent, or Firm* — Hawley Troxell Ennis & Hawley LLP; William J. Pigott

(57) ABSTRACT

A mobile electronic device holder includes a backing configured to support a rear surface of a mobile electronic device, according to one embodiment. The mobile electronic device holder includes a plurality of corner fasteners attached to the backing and configured to at least partially enclose a plurality of corners of the mobile electronic device, according to one embodiment. The mobile electronic device holder includes a mobile electronic device holder spine attached to the backing and configured to couple the backing to one of a plurality of multi-ring binders, according to one embodiment. The mobile electronic device holder includes nine grommets spaced and inserted into the mobile electronic device holder spine to selectively couple the backing to the plurality of multi-ring binders, the plurality of multi-ring binders including a 3-ring binder, a 5-ring binder, and a 7-ring binder, according to one embodiment.

12 Claims, 5 Drawing Sheets

US 9,537,528 B1

METHOD AND SYSTEM FOR SECURING A MOBILE ELECTRONIC DEVICE

CROSS REFERENCE TO RELATED APPLICATIONS

The present application claims priority benefit from U.S. Provisional Patent Application, Ser. No. 62/064,706, entitled "METHOD AND SYSTEM FOR SECURING A MOBILE ELECTRONIC DEVICE", filed Oct. 16, 2014, which is incorporated herein by reference.

BACKGROUND

Aircraft pilots are employed with the difficult task of safely transporting customers and cargo around the globe on a daily basis. To perform this task, they are provided with training, aircraft instrumentation, and aircraft controls. Additionally, aircraft pilots have historically had to keep records, take notes, and make calculations. While manual record taking, note taking, and calculations were historically performed using pen/pencil and paper, the advent of mobile electronic devices such as personal digital assistants, smart phones, tablet computing devices, and laptop computing devices has facilitated the performance of these additional tasks. Although mobile electronic devices can be extremely useful in the cockpit, turbulence and a general lack of unoccupied space can make it difficult for a pilot to operate and maintain control of the mobile electronic device.

What is needed is a method and system for securing a mobile electronic device, for example, within a binder or to the leg of an aircraft pilot or other person.

SUMMARY

Embodiments of the present disclosure facilitates the operation and control over mobile electronic devices in space-limited and/or turbulent environments. Embodiments of the present disclosure can be especially beneficial to aircraft pilots and other professions who carry and use binders while carrying out work responsibilities. A system for securing a mobile electronic device includes a mobile electronic device holder, according to one embodiment. The system for securing a mobile electronic device includes a multi-ring binder and a mobile electronic device holder having a plurality of apertures along one side of the mobile electronic device holder, with the plurality of apertures being configured to be mated to and secure with the rings of the multi-ring binder, according to one embodiment. The mobile electronic device holder secures the corners of a tablet computing device, smart phone, or other mobile electronic computing device to restrain the mobile electronic device to the mobile electronic device holder, according to one embodiment. The mobile electronic device holder and/or a multi-ring binder housing the mobile electronic device holder is attached to a leg (e.g., with a strap) of an aircraft pilot or other user to enable the user to operate a secured mobile electronic device in a space-limited and/or turbulent environment, without concern for dropping, damaging, losing, and/or fumbling the mobile electronic device, according to one embodiment These and other embodiments are disclosed in more detail below.

Using the disclosed embodiments of a method and system for securing a mobile electronic device provides a technical solution the technical problem of securing mobile electronic devices in turbulent and space-limited environments, such as an aircraft cockpit.

The method and system for securing a mobile electronic device results in a much more adaptable, stable, and convenient platform for operating a mobile electronic device, than simply resting a device on one's lap. This, in turn, results in: greater ability to concentrate on tasks at hand, decreased damage to devices, decreased replacement costs for damaged devices, and decreased risk of a device inadvertently engaging a system controller (e.g., an aircraft controller). In addition, the disclosed method and system for securing a mobile electronic device is not related to any fundamental economic practice, fundamental data processing practice, mental steps, or pen and paper based solutions, and is, in fact, directed to providing a safer and more convenient device operation environment. Consequently, the disclosed method and system for securing a mobile electronic device is not directed to, does not encompass, and is not merely, an abstract idea or concept.

In addition, the disclosed method and system for securing a mobile electronic device provides for significant improvements to the technical fields of aeronautics, mobile electronic devices, and user experience.

Figure 1:
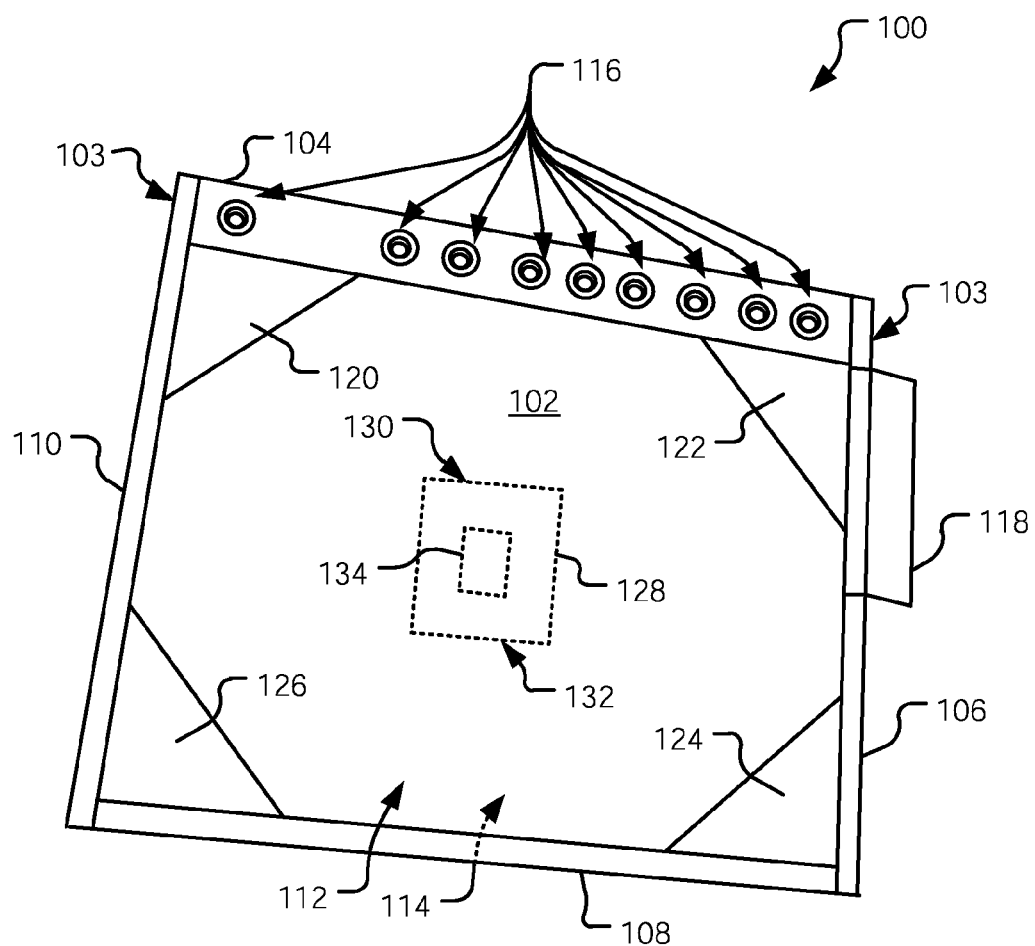
FIG. 1 is a diagram of front view of a system for securing a mobile electronic device in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DISCLOSURE

Embodiments will now be discussed with reference to the accompanying Figures, which depict one or more example embodiments of a mobile electronic device holder. Embodiments may be implemented in many different forms and should not be construed as limited to the embodiments set forth herein, shown in the Figures, and/or described below. Rather, these examples of embodiments are provided to allow a complete disclosure that conveys the principles of the invention, as set forth in the claims, to those of skill in the art.

Public availability and use of mobile electronic devices has increased significantly as the manufacturing costs and purchase prices decrease. With increased availability, mobile electronic devices are applied and used in a greater variety of environments. Accordingly, convenient systems and apparatuses for securing, carrying, and protecting the mobile electronic devices have become increasingly more desirable.

Embodiments of the present disclosure can be especially beneficial to aircraft pilots and other professions who carry and use binders while carrying out work responsibilities. A system for securing a mobile electronic device includes a mobile electronic device holder, according to one embodiment. The system for securing a mobile electronic device includes a multi-ring binder and a mobile electronic device holder having a plurality of apertures along one side of the mobile electronic device holder, with the plurality of apertures configured to mate and secure with the rings of the multi-ring binder, according to one embodiment. The mobile electronic device holder secures the corners of a tablet computing device, smart phone, or other mobile electronic computing device to restrain the mobile electronic device to the mobile electronic device holder, according to one embodiment. The mobile electronic device holder and/or a multi-ring binder housing the mobile electronic device holder is attached to a leg (e.g., with a strap) of an aircraft pilot or other user to enable the user to operate a secured mobile electronic device in a space-limited and/or turbulent environment, without concern for dropping, damaging, losing, and/or fumbling the mobile electronic device, according to one embodiment.

FIG. 1 illustrates a mobile electronic device holder 100, according to one embodiment. The mobile electronic device holder 100 is used to conveniently view and/or manipulate a mobile electronic device in a variety of environments and with a variety of platforms, according to one embodiment. The mobile electronic device holder 100 secures, immobilizes, and restrains a mobile electronic device while viewing and/or manipulating the mobile electronic device on a person's lap, within a multi-ring binder, with a clipboard, and/or while propped up on a surface, according to various embodiments.

The mobile electronic device holder 100 includes a backing 102 that provides a platform for the mobile electronic device to be secured or coupled to other carrying or storage systems, according to one embodiment. The backing 102 can include a core and an outer covering. The core can be rigid or flexible. The core can be configured to be rigid/inflexible and can include plastic, plexiglass, metal, or other rigid materials, according to one embodiment. The core can be configured to be flexible and can include cardboard, plastic, or other flexible materials, according to one embodiment. The outer covering of the backing 102 can include a decorative or protective material, according to one embodiment. For example, the outer covering can include Cordura®, canvas, leather, and/or other thick or protective materials, according to one embodiment. As another example, the outer covering can include (or be made of) cotton, plastic, metal, or other aesthetically pleasing or decorative material, according to one embodiment. The outer covering can be coupled, attached, or adhered to the core using a variety of techniques including, but not limited to, stitching, glue, staples, rivets, zippers, or the like.

The mobile electronic device holder 100 includes a first side 104, a second side 106, a third side 108, a fourth side 110, a front surface 112, and a back surface 114, according to one embodiment. As used herein, the term "side" is interchangeably used with the term "edge" for the perimeter of the mobile electronic device holder 100. The lengths of the sides 104, 106, 108, 110 and the dimensions of the surfaces 112, 114 can be varied to accommodate mobile electronic devices of varying dimensions. According to one embodiment, the dimensions of the sides 104, 106, 108, 110 and the surfaces 112, 114 is approximately 8.5 inches by 11 inches, to fit within a 3-ring binder. According to one embodiment, the dimensions of the sides 104, 106, 108, 110 and the surfaces 112, 114 is approximately 8.5 inches by 5 inches, to fit within a 3-ring, 5-ring, and/or 7-ring binder. According to one embodiment, the dimensions of the sides 104, 106, 108, 110 and the surfaces 112, 114 is configured to accommodate an iPad®, an iPad Mini™, an iPad Pro™, an iPad Air® or other tablet computing device having dimensions of: 12 inches by 8.68 inches, 9.56 inches by 7.47 inches, 9.5 inches by 7.31 inches, 9.4 inches by 6.6 inches, 7.87 inches by 5.3 inches, a length of 4-10 inches by a width of 3-8 inches, according to various embodiments.

The mobile electronic device holder 100 includes a plurality of apertures 116 in a mobile electronic device holder spine 103 of the mobile electronic device holder 100, along the first side 104 to enable the mobile electronic device holder 100 to be mated with, coupled to, or secured within a multi-ring binder or folder. The plurality of apertures 116 are implemented by inserting a plurality of grommets into the mobile electronic device holder 100, according to one embodiment. The grommets may be plastic, metal, or some other material that slideably couples to and/or is secured by binder rings, according to various embodiments. The mobile electronic device holder spine is stitched, glued, or otherwise mated or coupled to the backing 102, in one embodiment. The mobile electronic device holder 100 includes 2, 3, 5, 7, or 9 apertures 116, according to various implementations. If the mobile electronic device holder 100 includes 9 apertures 116 in the mobile electronic device holder spine 103, as illustrated, the apertures are spaced in accordance with the spacing used in 2-ring binders/folders, 3-ring binders/folders, 5-ring binders/folders, and 7-ring binders/folders, to flexibly accommodate being secured to various sizes and styles of multi-ring binders, according to one embodiment. The 9 apertures 116 are positioned in the mobile electronic device holder spine 103 of the mobile electronic device holder 100 to accommodate coupling with 3-ring binders/folders and 5-ring binders/folders and not with other multi-ring binders/folders, according to one embodiment. The 9 apertures 116 are positioned in the mobile electronic device holder spine 103 of the mobile electronic device holder 100 to accommodate coupling with 3-ring binders/folders and 7-ring binders/folders and not other multi-ring binders/folders, according to another embodiment. The apertures 116 advantageously enable the mobile electronic device holder 100 to be secured within and coupled to multiple variations of multi-ring binders/folders, e.g., 2-ring, 3-ring, 5-ring, 7-ring, and/or 9-ring binders, to retain, carry, couple, protect, and/or secure a mobile electronic device within the binder, folder, or other protective system or platform, according to various embodiments. Multi-ring binders can be used to carry, protect, and secure mobile electronic devices such as tablet computing devices or touch screen computing devices in industrial environments, such a garage door installation companies or construction companies, in schools or other educational environments, in aviation environments, e.g., by pilots in a cockpit, in athletics, e.g., by coaches or athletes, and/or in other environments where it may be advantageous to retain a combination of paper and electronic devices in close proximity to each other, according to various embodiments.

While the apertures 116 are illustrated as being positioned/disposed on a single edge/side, e.g., side 106, of the mobile electronic device holder 100, in other implementations, the apertures 116 can be positioned on two or more edges/sides in two or more mobile electronic device holder spines of the mobile electronic device holder 100, to enable coupling with a variety of additional binders. For example, the mobile electronic device holder spine 103 may be configured to accommodate 3-ring binders and 5 ring binders, and the side 108 may have a second mobile electronic device spine that can be configured to accommodate 2-ring binders and 7-ring binders, according to one embodiment. Accordingly, the mobile electronic device holder spine 103 includes more (or fewer) than 9 apertures 116, according to various implementations.

The mobile electronic device holder 100 optionally includes an indexing tab 118 to enable a user to index, open, or "flip" to the mobile electronic device in a multi-ring binder/folder that includes multiple inserts, pages, and/or sub-folders, in one embodiment. The indexing tab 118 may be manufactured from the same material as the outer covering. The indexing tab 118 may be manufactured from plastic or another material to enable a user to mark, erase, and re-mark the indexing tab 118, according to one embodiment.

The mobile electronic device holder 100 includes corner fasteners 120, 122, 124, 126 for securing a mobile electronic device to the backing 102, according to one embodiment. The corner fasteners 120, 122, 124, 126 are manufactured from an elastic material or fabric to provide a secure, tight, and flexible coupling of the mobile electronic device to the backing 102, according to one embodiment. The four corner fasteners 120, 122, 124, 126 may be used, but in other embodiments, two or three corner fasters are used, leaving one corner of the mobile electronic device unfastened. The corner fasteners 120, 122, 124, 126 provide a secure coupling between the mobile electronic device and the backing 102 in turbulent, undulating, and/or shaky environments, such as in an aircraft, in a duffle bag, in a backpack, or the like, according to one embodiment. The corner fasteners 120, 122, 124, 126 may be implemented using Velcro, plastic, rubber, leather, pleather, or other attachable/detachable material, according to other implementations.

The mobile electronic device holder 100 includes a flap 128 that selectively extends partially away from the backing 102 to enable the use to prop, rest, or lay the mobile electronic device holder 100 in a substantially upright or upright and inclined position, according to one embodiment. The flap 128 can include a core that may be rigid or flexible and which many include one or more of the core materials described above for the backing 102, according to one embodiment. The flap 128 can include an outer cover that may include one or more of the outer cover materials described above as potentially used on the backing 102, according to one embodiment. The flap 128 is attached to the back surface 114 and includes an anchored end 130 and a free end 132. The anchored end 130 is attached to the back surface 114 of the backing 102 and provides a pivot point for the free end 132 to selectively extend away from the back surface 114 of the backing 102, according to one embodiment.

A fastener 134 controls the distance with which the free end 132 extends away from the backing 102, according to one embodiment. The fastener 134 includes Velcro to secure the free end 132 to the back surface 114 when the flap 128 is not in use for propping the mobile electronic device holder 100 on a surface, according to one embodiment. Alternatively, the fastener 134 may be implemented with snaps, magnets, or other fasteners that enable repeated secure and release operation of the flap 128 and the free end 132, according to various implementations.

Figure 2:
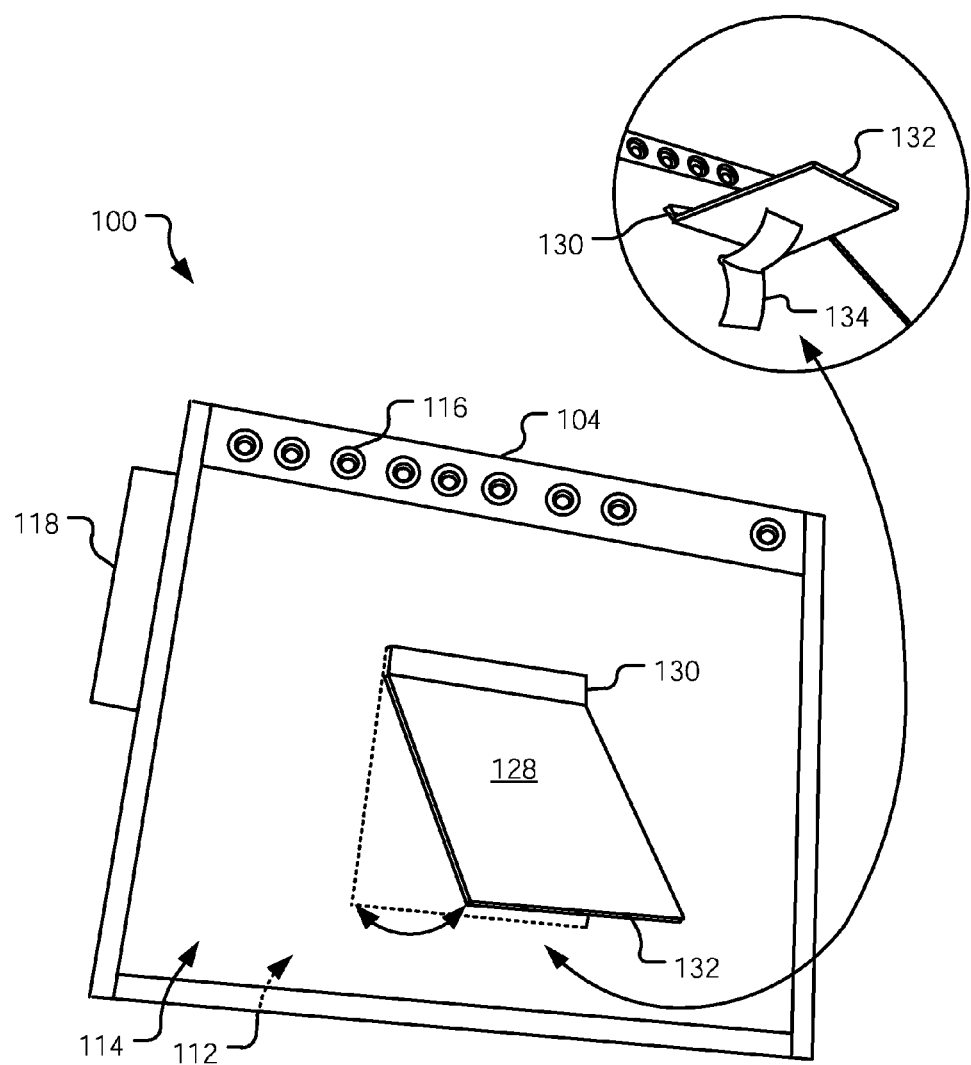
FIG. 2 is a diagram of a rear view of a system for securing a mobile electronic device in accordance with one embodiment.

FIG. 2 illustrates a rear view of the mobile electronic device holder 100, according to one embodiment.

Figure 3:
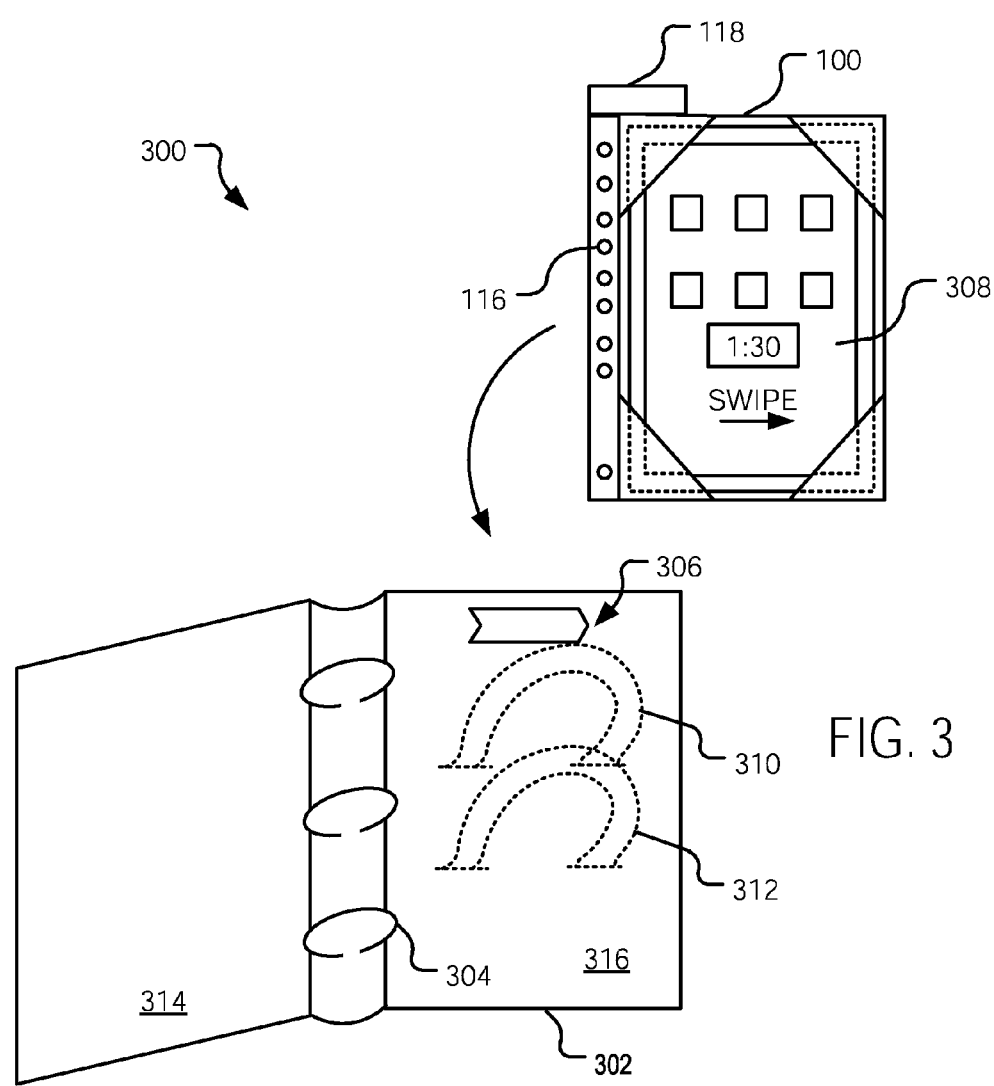
FIG. 3 is a diagram of a system for securing a mobile electronic device in accordance with one embodiment.

FIG. 3 illustrates a system 300 for securing, protecting, and/or carrying a mobile electronic device with the mobile electronic device holder 100, according to one embodiment. The system 300 includes a multi-ring binder 302 having a plurality of rings 304, e.g., three rings, five rings, or seven rings, for retaining and/or securing the mobile electronic device holder 100 to the multi-ring binder 302, according to one embodiment. In one embodiment, the multi-ring binder is one of an 8.5 inch by 11 inch 3-ring binder, a 5 inch by 8.5 inch 3-ring binder, and a 5 inch by 8.5 inch 7-ring binder, any of which the mobile electronic device holder 100 is coupleable to, through the apertures 116. The multi-ring binder 302 may alternatively or additionally include a spring-loaded clip-board style clip 306 for retaining the mobile electronic device holder 100 to the multi-ring binder 302, according to one embodiment. As illustrated, the system 300 is used to carry, secure, and/or protect a mobile electronic device 308 (e.g., an iPad®) carried and retained by the mobile electronic device holder 100, according to one embodiment. The multi-ring binder 302 includes a leg strap 310, to enable a user to strap and therefore secure the multi-ring binder 302 with the mobile electronic device holder 100 to the leg of a user, e.g., an aircraft pilot. The multi-ring binder 302 includes a leg strap 312, in addition to the leg strap 310, according to one embodiment. In one embodiment, the multi-ring binder 302 includes a front binder cover 314 and a rear binder cover 316 for protecting the mobile electronic device 308. In alternative embodiment, the multi-ring binder 302 includes the rear binder cover 316, at least one of the leg straps 310, 312, and excludes the front binder cover 314, to enable hands free retention and viewing of the mobile electronic device 308 while the mobile electronic device 308 is secured to the leg of a user or while the mobile electronic device 308 is propped up on one or more surfaces.

Figure 4:
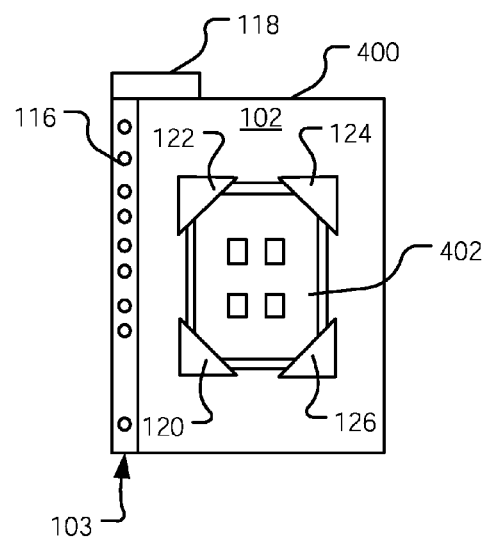
FIG. 4 is a diagram of a system for securing a mobile electronic device in accordance with one embodiment.

FIG. 4 illustrates a mobile electronic device holder 400 that is configured for securing, retaining, and/or carrying a mobile electronic device 402 that is smaller than the dimensions of the backing 102 of the mobile electronic device holder 400, according to one embodiment. The corner fasteners 120, 122, 124, 126 are recessed from the perimeter or displaced from the edges of the backing 102 of the mobile electronic device holder 400, to accommodate particular dimensions of the mobile electronic device 402, according to one embodiment. The corner fastener 122 is disposed approximately 9.75 inches away from the corner fastener 120, the corner fastener 124 is disposed approximately 9.75 inches away from the corner fastener 126, the corner fastener 122 is disposed approximately 7.7 inches away from the corner fastener 124, the corner fastener 126 is disposed approximately 7.7 inches away from the corner fastener 120, to accommodate a mobile electronic device 402 having dimensions of approximately 9.56 inches by 7.47 inches, according to one embodiment. The corner fastener 122 is disposed approximately 9.7 inches away from the corner fastener 120, the corner fastener 124 is disposed approximately 9.7 inches away from the corner fastener 126, the corner fastener 122 is disposed approximately 7.5 inches away from the corner fastener 124, the corner fastener 126 is disposed approximately 7.5 inches away from the corner fastener 120, to accommodate a mobile electronic device 402 having dimensions of approximately 9.5 inches by 7.31 inches, according to one embodiment. The corner fastener 122 is disposed approximately 9.6 inches away from the corner fastener 120, the corner fastener 124 is disposed approximately 9.6 inches away from the corner fastener 126, the corner fastener 122 is disposed approximately 6.8 inches away from the corner fastener 124, the corner fastener 126 is disposed approximately 6.8 inches away from the corner fastener 120, to accommodate a mobile electronic device 402 having dimensions of approximately 9.4 inches by 6.6 inches, according to one embodiment. The corner fastener 122 is disposed approximately 8.1 inches away from the corner fastener 120, the corner fastener 124 is disposed approximately 8.1 inches away from the corner fastener 126, the corner fastener 122 is disposed approximately 5.5 inches away from the corner fastener 124, the corner fastener 126 is disposed approximately 5.5 inches away from the corner fastener 120, to accommodate a mobile electronic device 402 having dimensions of approximately 7.87 inches by 5.3 inches, according to one embodiment. In one embodiment, the mobile electronic device holder spine 103 is the same length as the backing 102. In one embodiment, the length of the mobile electronic device holder spine 103 is shorter than the length of the backing 102. In one embodiment, the length of the mobile electronic device holder spine 103 is longer than the length of the backing 102.

Figure 5:
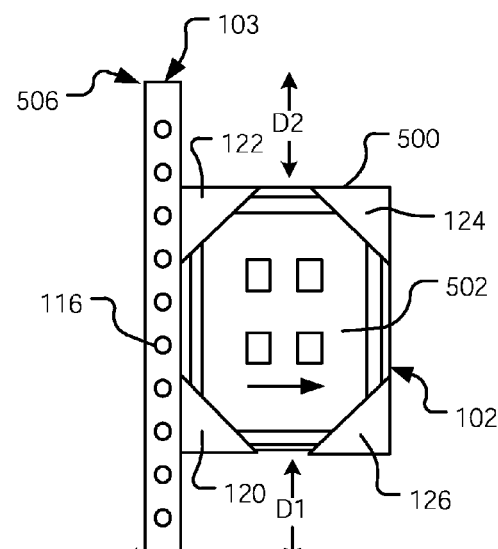
FIG. 5 is a diagram of a system for securing a mobile electronic device in accordance with one embodiment.

FIG. 5 illustrates a mobile electronic device holder 500 that is configured for securing, retaining, and/or carrying a mobile electronic device 502 that is smaller than the length of the mobile electronic device holder spine 103, according to one embodiment. The length of the backing 102 is shorter than the length of the mobile electronic device holder spine 103, according to one embodiment. The corner fasteners 120, 122, 124, 126 are disposed along the edges of the backing 102, according to one embodiment. The corner fasteners 120, 122, 124, 126 are disposed along the edges of the backing 102 in accordance with one of the dimensions disclosed above for the mobile electronic device holder 400, according to one embodiment. The backing 102 is offset by a distance D1 from a lower edge 504 of the mobile electronic device holder spine 103, and the backing 102 is offset by a distance D2 from an upper edge 506 of the mobile electronic device holder spine 103, according to one embodiment.

Figure 6:
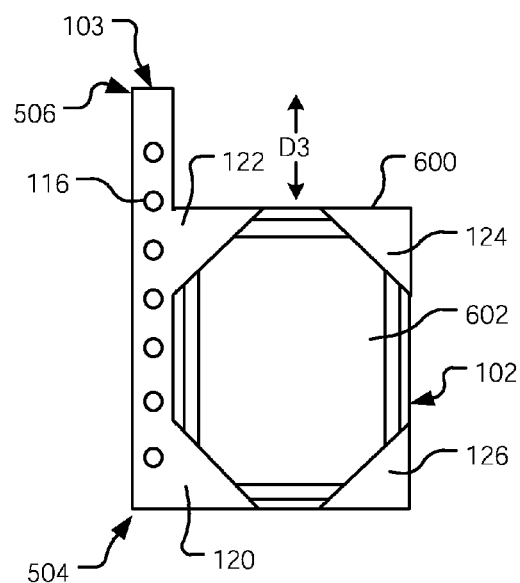
FIG. 6 is a diagram of a system for securing a mobile electronic device in accordance with one embodiment.

FIG. 6 illustrates a mobile electronic device holder 600 that is configured for securing, retaining, and/or carrying a mobile electronic device 602 that is smaller than the length of the mobile electronic device holder spine 103, according to one embodiment. The length of the backing 102 is shorter than the length of the mobile electronic device holder spine 103, according to one embodiment. The corner fasteners 120, 122, 124, 126 are disposed along the edges of the backing 102, according to one embodiment. The corner fasteners 120, 122, 124, 126 are disposed along the edges of the backing 102 in accordance with one of the dimensions disclosed above for the mobile electronic device holder 400, according to one embodiment. The backing 102 is flush with the lower edge 504 of the mobile electronic device holder spine 103, and the backing 102 is offset by a distance D3 from the upper edge 506 of the mobile electronic device holder spine 103, according to one embodiment.

The various embodiments of mobile electronic device holders are means for securing a mobile electronic device, according to one embodiment. The means for securing a mobile electronic device include, but are not limited to, a mobile electronic device holder, a backing, a mobile electronic device spine, a plurality of grommets (e.g., 9 grommets) in the mobile electronic device spine and configured to enable the mobile electronic device holder to be switched between and coupled to several different multi-ring binders (e.g., a 2-ring, 3-ring, 5-ring, and 7-ring binder), a reference tab, a flap for substantially vertically propping or standing up the mobile electronic device spine, a backing that has a shorter length than the mobile electronic device spine, a backing that is offset between the two edges of the mobile electronic device spine, and a plurality of corner fasteners configured to secure a mobile electronic device to the backing while enabling viewing and operation of the mobile electronic device, according to various disclosed embodiments.

Figure 7:
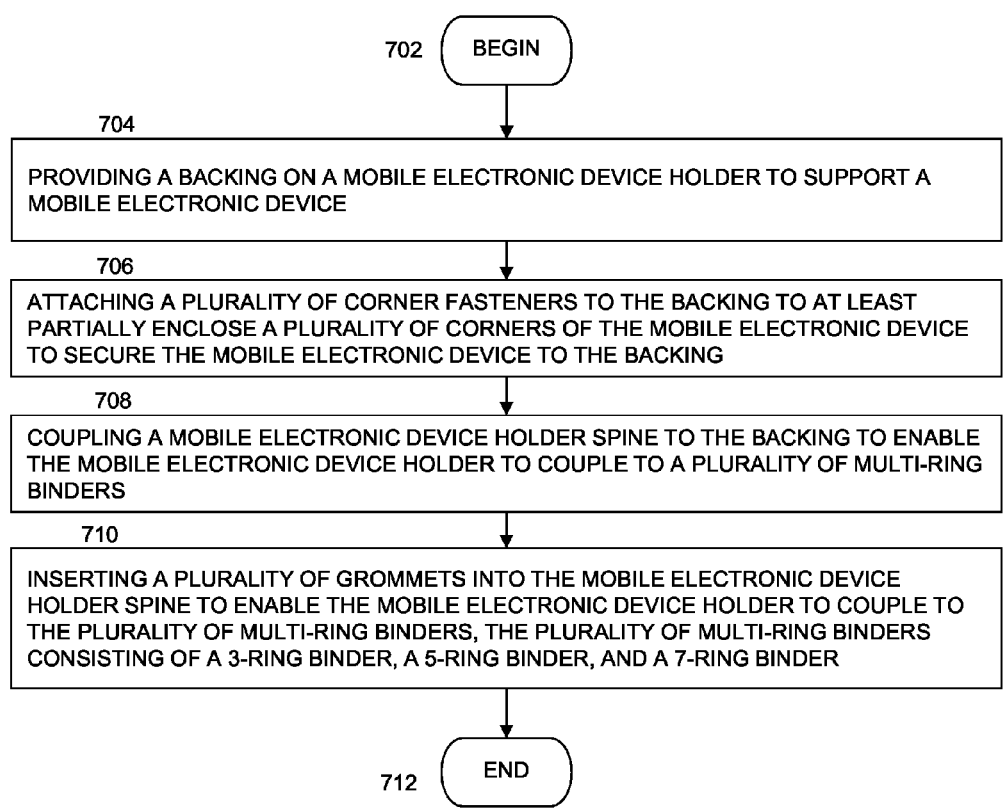
FIG. 7 is a flow diagram of a method for securing a mobile electronic device in accordance with one embodiment.

FIG. 7 illustrates a flow diagram 700 of a method for securing a mobile electronic device, according to one embodiment.

At operation 702, the process begins, according to one embodiment. Operation 702 proceeds to operation 704, according to one embodiment.

At operation 704, the process includes providing a backing on a mobile electronic device holder to support a mobile electronic device, according to one embodiment.

At operation 706, the process includes attaching a plurality of corner fasteners to the backing to at least partially enclose a plurality of corners of the mobile electronic device to secure the mobile electronic device to the backing, according to one embodiment.

At operation 708, the process includes coupling a mobile electronic device holder spine to the backing to enable the mobile electronic device holder to couple to a plurality of multi-ring binders, according to one embodiment.

At operation 710, the process includes inserting a plurality of grommets into the mobile electronic device holder spine to enable the mobile electronic device holder to couple to the plurality of multi-ring binders, the plurality of multi-ring binders consisting of a 3-ring binder, a 5-ring binder, and a 7-ring binder, according to one embodiment.

At operation 712, the process ends, according to one embodiment.

Using the disclosed embodiments of a method and system for securing a mobile electronic device provides a technical solution the technical problem of securing mobile electronic devices in turbulent and space-limited environments, such as an aircraft cockpit.

The method and system for securing a mobile electronic device results in a much more adaptable, stable, and convenient platform for operating a mobile electronic device, than simply resting a device on one's lap. This, in turn, results in: greater ability to concentrate on tasks at hand, decreased damage to devices, decreased replacement costs for damaged devices, and decreased risk of a device inadvertently engaging a system controller (e.g., an aircraft controller). In addition, the disclosed method and system for securing a mobile electronic device is not related to any fundamental economic practice, fundamental data processing practice, mental steps, or pen and paper based solutions, and is, in fact, directed to providing a safer and more convenient device operation environment. Consequently, the disclosed method and system for securing a mobile electronic device is not directed to, does not encompass, and is not merely, an abstract idea or concept.

In addition, the disclosed method and system for securing a mobile electronic device provides for significant improvements to the technical fields of aeronautics, mobile electronic devices, and user experience.

In accordance with an embodiment, a mobile electronic device holder includes a backing configured to support a rear surface of a mobile electronic device. The mobile electronic device holder includes a plurality of corner fasteners attached to the backing and configured to at least partially enclose a plurality of corners of the mobile electronic device, to secure the mobile electronic device to the backing, according to one embodiment. The mobile electronic device holder includes a mobile electronic device holder spine attached to the backing and configured to couple the backing to one of a plurality of multi-ring binders to prevent the mobile electronic device from sliding out of the one of the plurality of multi-ring binders, according to one embodiment. The mobile electronic device holder includes nine grommets spaced and inserted into the mobile electronic device holder spine to selectively couple the backing to the plurality of multi-ring binders, the plurality of multi-ring binders including a 3-ring binder, a 5-ring binder, and a 7-ring binder, to enable a user to select any one of the plurality of multi-ring binders for mating with and carrying the mobile electronic device holder, according to one embodiment.

In accordance with an embodiment, a system for securing a mobile electronic device includes a multi-ring binder. The multi-ring binder includes a rear binder cover configured to support a rear surface of a mobile electronic device, according to one embodiment. The multi-ring binder includes a plurality of rings attached to the rear binder cover that are manually openable and closeable, according to one embodiment. The system for securing a mobile electronic device includes a means for securing the mobile electronic device and for coupling the mobile electronic device to the multi-ring binder, according to one embodiment. The means for securing the mobile electronic device includes a backing configured to support the rear surface of the mobile electronic device, according to one embodiment. The means for securing the mobile electronic device includes a plurality of corner fasteners, according to one embodiment. The means for securing the mobile electronic device includes a mobile electronic device holder spine attached to the backing, according to one embodiment. The means for securing the mobile electronic device includes nine grommets inserted into the mobile electronic device holder spine, according to one embodiment.

In accordance with an embodiment, a method includes providing a backing on a mobile electronic device holder to support a mobile electronic device. The method includes attaching a plurality of corner fasteners to the backing to at least partially enclose a plurality of corners of the mobile electronic device to secure the mobile electronic device to the backing, according to one embodiment. The method includes coupling a mobile electronic device holder spine to the backing to enable the mobile electronic device holder to couple to a plurality of multi-ring binders, according to one embodiment. The method includes inserting a plurality of grommets into the mobile electronic device holder spine to enable the mobile electronic device holder to couple to the plurality of multi-ring binders, the plurality of multi-ring binders consisting of a 3-ring binder, a 5-ring binder, and a 7-ring binder, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes are not significant, mandatory, or limiting, and the mechanisms that implement the invention or its features can have various different names, formats, or protocols. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the Figures, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A mobile electronic device holder, comprising:
   a backing configured to support a rear surface of a mobile electronic device;
   a plurality of corner fasteners attached to the backing and configured to at least partially enclose a plurality of corners of the mobile electronic device, to secure the mobile electronic device to the backing;
   a mobile electronic device holder spine attached to the backing and configured to couple the backing to one of a plurality of multi-ring binders to prevent the mobile electronic device from sliding out of the one of the plurality of multi-ring binders; and
   nine grommets spaced and inserted into the mobile electronic device holder spine to selectively couple the backing to the plurality of multi-ring binders, the plurality of multi-ring binders including a 3-ring binder, a 5-ring binder, and a 7-ring binder, to enable a user to select any one of the plurality of multi-ring binders for mating with and carrying the mobile electronic device holder.

2. The mobile electronic device holder of claim 1, further comprising:
   a reference tab attached to a top edge of the backing to enable a user to select the mobile electronic device holder from a plurality of inserts in one of the plurality of multi-ring binders.

3. The mobile electronic device holder of claim 1, further comprising:

a flap attached to a rear surface of the backing and configured to prop the mobile electronic device holder in a substantially upright position, the flap having a fixed edge and a free edge, the free edge configured to rest on a surface to support the mobile electronic device holder in the substantially upright position.

4. The mobile electronic device holder of claim 3, further comprising:
a flap fastener attached between the flap and the rear surface of the backing to selectively secure the free edge to the rear surface of the backing, the flap fastener configured to limit an extension distance of the free edge from the rear surface of the backing.

5. The mobile electronic device holder of claim 4, wherein the flap fastener is selected from a group of fasteners consisting of a Velcro fastener, a snap fastener, and a magnetic fastener.

6. The mobile electronic device holder of claim 1, wherein a length of the backing is longer than a width of the backing, wherein a length of the mobile electronic device holder spine is shorter than the length of the backing.

7. The mobile electronic device holder of claim 1, wherein a length of the backing is longer than a width of the backing, wherein a length of the mobile electronic device holder spine is longer than the length of the backing.

8. The mobile electronic device holder of claim 7, wherein a top edge of the backing is offset from a top edge of the mobile electronic device holder spine and a bottom edge of the backing is offset from a bottom edge of the mobile electronic device holder spine.

9. The mobile electronic device holder of claim 7, wherein a top edge of the backing is offset from a top edge of the mobile electronic device holder spine and a bottom edge of the backing is flush with a bottom edge of the mobile electronic device holder spine.

10. The mobile electronic device holder of claim 1, wherein the plurality of corner fasteners are disposed on the backing to secure the plurality of corners of the mobile electronic device, wherein length and width dimensions of the mobile electronic device is selected from a group of length and width dimensions consisting of:
12 inches by 8.68 inches;
9.56 inches by 7.47 inches;
9.5 inches by 7.31 inches;
9.4 inches by 6.6 inches; and
7.87 inches by 5.3 inches.

11. The mobile electronic device holder of claim 10, wherein length and width dimensions of the backing approximately matches the length and width dimensions of the mobile electronic device.

12. The mobile electronic device holder of claim 1, wherein the plurality of multi-ring binders further includes a 2-ring binder.

* * * * *